United States Patent [19]

Jensen et al.

[11] Patent Number: 5,140,609
[45] Date of Patent: Aug. 18, 1992

[54] TRD TEMPERATURE SENSOR

[75] Inventors: Stephen C. Jensen, Edina, Minn.; Stanley E. Stokowski, Danville, Calif.

[73] Assignee: Rosemount Inc., Eden Prairie, Minn.

[21] Appl. No.: 759,476

[22] Filed: Sep. 13, 1991

Related U.S. Application Data

[62] Division of Ser. No. 599,814, Oct. 18, 1990.

[51] Int. Cl.$^5$ .................................................. G01J 5/02
[52] U.S. Cl. ............................... 374/161; 250/461.1; 250/227.27; 252/962
[58] Field of Search ............... 374/161; 250/461.1, 250/227.27; 252/962

[56]  References Cited
U.S. PATENT DOCUMENTS

| | | | |
|---|---|---|---|
| 4,708,494 | 11/1987 | Kleinerman | 374/161 |
| 4,816,687 | 3/1989 | Fehrenbach et al. | |
| 5,035,513 | 7/1991 | Fehrenbach et al. | 374/161 |
| 5,036,194 | 7/1991 | Hazel | 260/227.27 |

OTHER PUBLICATIONS

Knierim et al., "Optical and Lasing Properties of $V_2{}^+$--doped Halide Crystals", J. Opt. Soc. Am. B, vol. 3, No. 1, pp. 119–124 (Jan. 1986).

Jensen et al., "A Fiber Optic Temperature Sensor for Aerospace Applications", OE/FIBER '90 Conference, San Jose, Calif. Sep. 16–21, 1990, sponsored by the Society of Photo–Optical Instrument Engineers (SPIE).

Primary Examiner—Mark Hellner
Attorney, Agent, or Firm—Kinney & Lange

[57] ABSTRACT

A temperature sensing system has a signal means which provides a signal representative of a temperature responsive luminescence, where the luminescence has a characteristic time-rate-of-decay. A means for comparison is connected to the signal means and samples the signal during two time intervals, the first interval overlapping the second. The averages of the samples are compared to provide a difference signal representative of the difference between the two measured averages. Control means coupled to the comparison means provide an output representing the temperature as a function of the time-rate-of-decay, by adjusting the overlapping intervals so that the difference signal converges to a preselected limit.

3 Claims, 6 Drawing Sheets

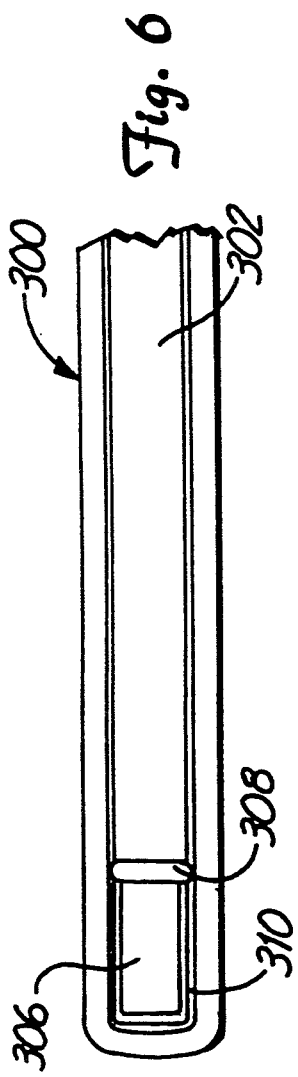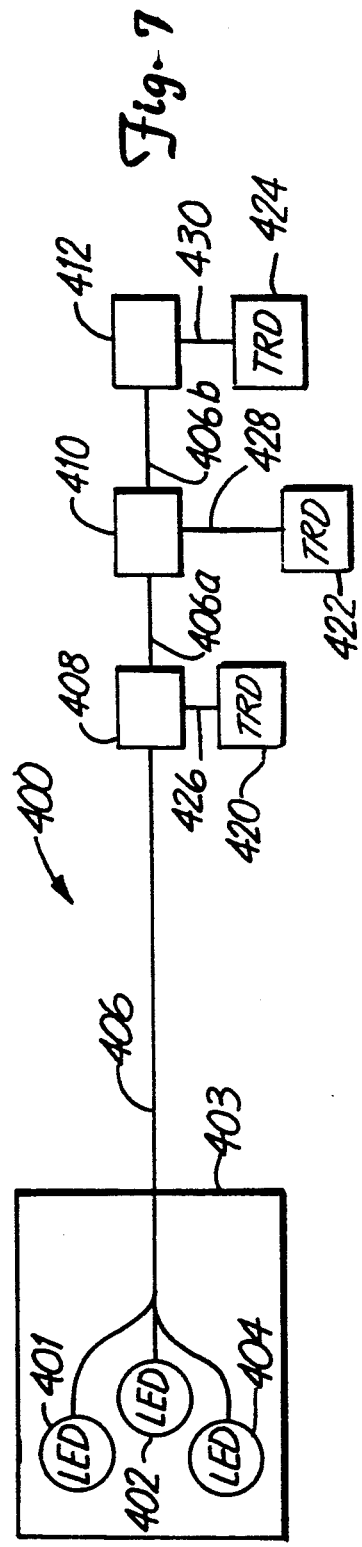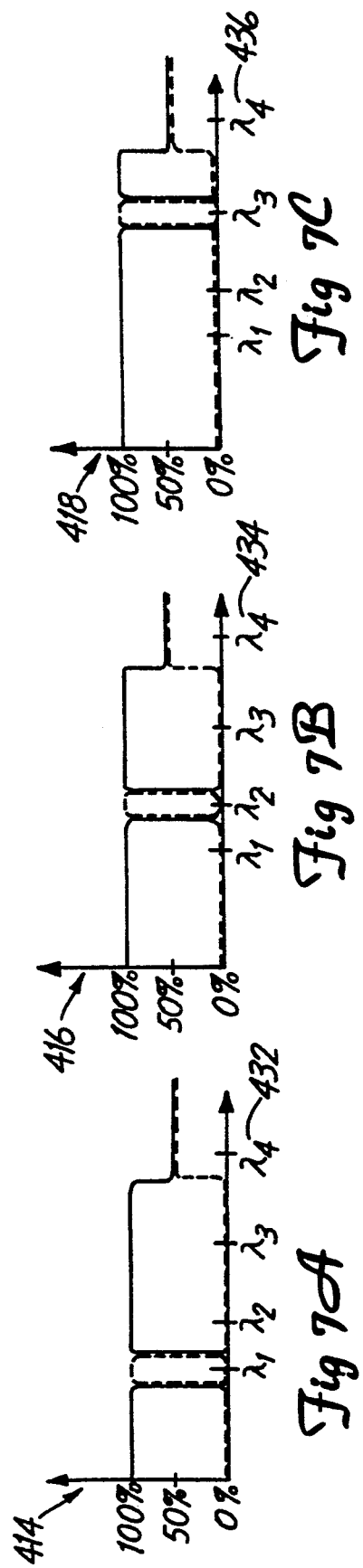

TRD TEMPERATURE SENSOR

This application is a division of U.S. application Ser. No. 07/599,814 filed Oct. 18, 1990 and assigned to the same assignee as the present application.

BACKGROUND OF THE INVENTION

The present invention relates to optical temperature measurement using a time rate of decay measurement.

In passive optical temperature sensing, a time-rate-of-decay (TRD) temperature sensing probe is thermally coupled to an object to measure its temperature. The probe tip includes luminescent material emitting radiation at a wavelength characteristic to the material upon excitation by radiation at another material characteristic wavelength. The luminescent material is typically in the form of a sectioned, polished crystal or a powder embedded in a binder. Both the emission and the excitation wavelengths are determined by the type of luminescent material in the probe, and the intensity of the excitation is significantly more intense than that of the emitted radiation. The luminescent emission decays substantially exponentially with time and the exponential time constant of the emission curve is responsive to the temperature.

Luminescence is characterized by light emission from matter and describes several processes resulting in such emission. The luminescent emission intensity, lifetime and frequency spectrum can be temperature dependent, and therefore one or more of these parameters may be used as a thermoresponse parameter. Fluorescence and phosphorescence are two emissive processes defined quantum mechanically. Quantum mechanics teach that an electron surrounding an atomic nucleus has specific quantized, allowed states of energy characterized by quantum numbers. One of the quantum numbers is the spin quantum number, S, which is a measure of the angular momentum of the electron orbit in the energy state. Spin orbit quantum numbers are given by $S = \frac{1}{2} \pm n$, where n is an integer. When a magnetic field is present within the atom, a spin orbit state may split into two allowed states by a process called spin-orbit splitting. The energy difference between the split states is proportional to the atomic number. Consequently, materials with a large atomic number which also have atomic magnetic fields have multiple states between which electrons may transition.

An atom phosphoresces when an electron makes a transition from one state having a spin orbit quantum number S to a second state with the same numerical quantum number, S. Phosphorescence is characterized by a relatively long emissive duration, between a microsecond and $1 \times 10^3$ seconds. Fluorescence occurs when the electron transition occurs between states of different numerical spin quantum number and is characterized by emissions of comparatively short lifetime, from $1 \times 10^{-2}$ seconds to $1 \times 10^{-10}$ seconds. In most cases, activated interstitial atomic impurities, typically called "dopant" atoms in the literature, provide free electrons. Fluorescence and phosphorescence may occur in the same material if there are a substantial number of free electrons and spin orbit coupling, since the electrons are provided with multiple energy states of differing S.

The literature defining luminescent, fluorescent and phosphorescent processes is inconsistent. Sometimes processes are identified by measurement of the duration of the emission; sometimes, they are identified by a quantum mechanical analysis of the problem. In this patent application, the terms fluorescence and phosphorescence are defined as discussed above. Additionally, luminescent materials with activation sites having a high atomic number, which may luminesce via phosphorescence, fluorescence or both processes will be exclusively called luminescent materials. Readers are referred to Kittel, *Introduction to Solid State Physics*, Wiley, 1976 for further reading.

In a typical TRD probe, luminescent material is located in the probe tip. Upon excitation, a luminescent emission occurs which is coupled to a detector by an optical fiber. The detector converts the emission into a current having an amplitude varying with the emissive intensity. Electronics process the detector output by various means to determine the substantially exponential time constant. The decay characteristics of the detector output is substantially exponential but may be characterized linearly or having other functionality over various intervals of time. Once the time constant is measured, a look-up table or an equation curve-fitted to empirical data is used to calculate temperature.

The form of the luminescent material in the probe has some limitations, however. Some probes have a solid piece of luminescent material in the probe tip which may be crystalline or amorphous. In this application the piece of luminescent material will be called a crystal. Such luminescent probe tip materials are called crystals in this application. Other probes have a solid piece of luminescent material made of powdered crystalline or amorphous material embedded in a binder. Still other probes have a powder without a binder in the probe tip. Sectioning and polishing can break crystals during manufacture. Furthermore, there is a wide variation in luminescent signal intensities so that the electronics are individually adjusted for each crystal probe tip. Such adjustment is labor intensive and time consuming in a manufacturing environment. While the powdered form embedded in a binder improves the amount of intensity variation between crystals compared to that of a polished crystal, the resulting emissive intensity is still orders of magnitude lower than the excitation radiation. Therefore, the embedded powdered form results in a more easily interchangeable probe tip than does the polished crystal, but is still not optimized for a manufacturing process.

Sensitivity and intensity of luminescent emission over the temperature range of interest can be optimized by proper material choice. However, the emission intensity or low sensitivity of some materials is still often comparable to noise, requiring excessive electronic amplification and subsequent distortion.

Various types of electronics are used to measure a quantity related to the time rate of decay of the emission. One method measures the time for a preselected emissive intensity to halve. This method is most successful when the signal intensity is large compared to the background noise. Digital techniques digitize the emission at a high sampling rate and curve fit the resulting sampled emission curve. One analog technique measures a phase difference between the excitation radiation and the emission and correlates the phase difference to the temperature. Some methods of measuring time rate of decay are susceptible to background level variations or drift, as well as variations in signal level.

Therefore, there is a need for a temperature probe having sufficiently strong emission intensities to preclude excessive amplification, and signal processing which is insensitive to background level and signal level variations.

SUMMARY OF THE INVENTION

The present invention relates to a temperature measurement system for measuring the thermally responsive time-rate-of-decay characteristic of a luminescent signal.

The invention is practiced in a temperature sensing system, where the system has a signal means for providing a signal representative of a temperature responsive luminescence having a characteristic time-rate-of-decay and has comparison means coupled to the signal means for sampling the signal during two time intervals, the first interval overlapping the second. The comparison means compares the average values of the samples to provide a difference signal representative of the difference therebetween. Control means coupled to the comparison means provide an output representing the temperature as a function of the time-rate-of-decay, by adjusting the intervals so that the difference signal converges to a preselected limit.

The comparison means preferably include autozeroing means which substantially remove an undesirable DC offset from the luminescent signal before the sampling.

In the present invention, the luminescent material in the signal means is preferably in a powder form where a gas separates the particles in the powder. The powder is made of a luminescent material containing chromium such as CR:GGG, Cr:GSGG and Cr:Beryl, and is pressed into a tube by an optical fiber which conducts the luminescence to the comparison and control means in the system. The end of the optical fiber which is pressed into the powder is preferably tapered. Alternatively, other means for increasing the numerical aperture of the fiber may be used such as an integral ball lens or a separate lens. The powder substantially comprises particles having a diameter less than two-third the diameter of the optical fiber. The luminescent material can be coated with an inert material which is an efficient absorber for emitting blackbody radiation.

BRIEF DESCRIPTION OF THE DRAWINGS

FIG. 6 is a cross sectional drawing of combination blackbody and TRD temperature probe 300;

FIG. 7 is a drawing of a TRD temperature sensing application including three probes, three couplers and a common optical fiber highway; and FIGS. 7A, 7B and 7C illustrate the spectral characteristics of the three couplers.

DETAILED DESCRIPTION OF THE PREFERRED EMBODIMENTS

Figure 1:
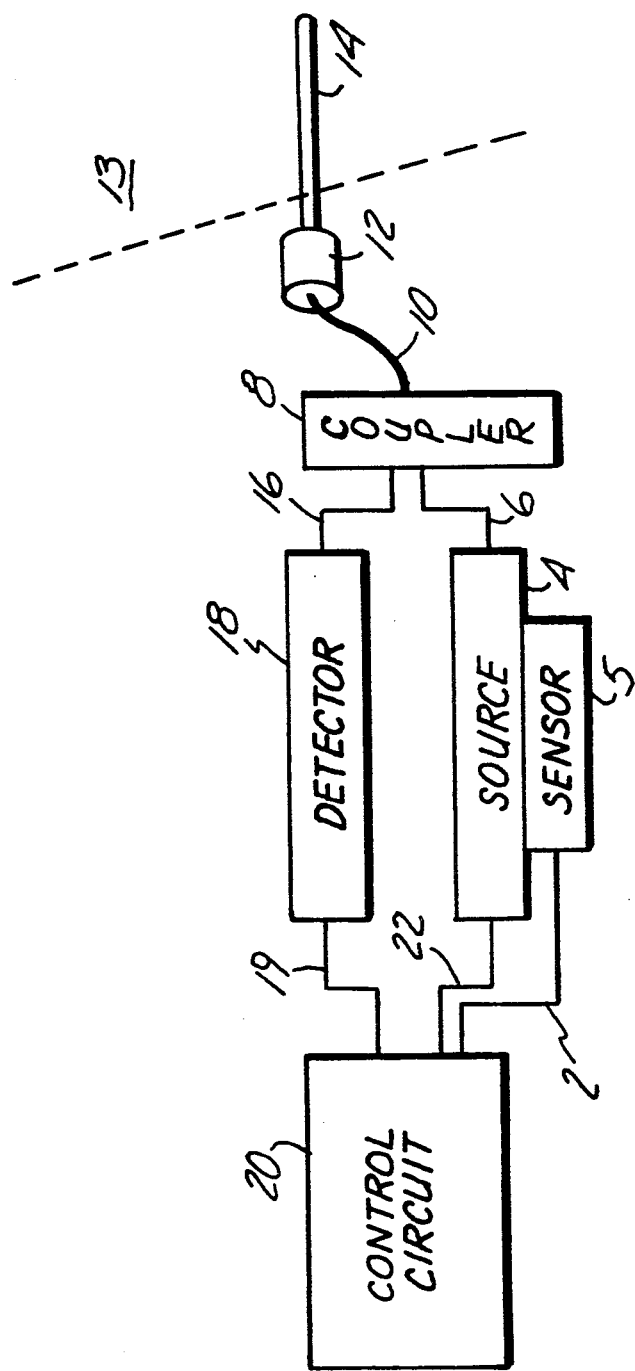
FIG. 1 shows a TRD sensing application including a TRD temperature probe and signal processing electronics.

FIG. 1 shows a temperature sensing system using a TRD temperature probe. Processing electronics 20 send signals to a source 4 over cabling 22 which cause source 4 to emit light. Source 4 is preferably an LED but may be an alternative source such as a laser. Some of the light is coupled to an optical fiber 6, through optical coupler 8, through an optical fiber 10 and to a connector 12. Alternately, optical fiber 6 may be eliminated. Connector 12 couples light to a TRD temperature probe 14 which is located in a rugged high temperature environment shown generally at 13, such as an aircraft engine. Other uses include thermal profile characterization. Temperature probe 14 contains luminescent material which luminesces upon excitation by the light carried in fiber 10. The luminescent material luminesces most efficiently at a specific material dependent wavelength, and emits luminescent radiation around a characteristic wavelength as well. Source 4 is selected to provide radiation of such a wavelength as to excite the luminescent material. Source 4 radiates for a preselected time $t_{ON}$ before turning off. The luminescence is sampled after source 4 has substantially turned off or has suddenly decreased in intensity. The luminescence decays substantially exponentially with time and the exponential time constant of the luminescent emission is responsive to the temperature. The luminescent intensity is substantially of the form:

$$e^{-\frac{t}{\tau}} \tag{1}$$

where t is the time and $\tau$ is the thermally responsive exponential time constant.

The luminescence is coupled to optical fiber 10 through connector 12 and on to coupler 8. Coupler 8 passes the emissive luminescent radiation over an optical fiber 16 to a detector 18. Alternatively, optical fiber 16 may be eliminated. The detector comprises a silicon photodiode having peak responsivity substantially in the same band of wavelengths as the luminescence emission. The diode converts the luminescence to a current representative of the luminescent intensity. A stage of amplification is typically included between the detector and signal processing electronics, since detector output at 19 typically is approximately a few nanoamperes. Electronics 20 receives a signal representative of the luminescence, samples such signal over two overlapping time intervals and provides a difference signal as a function of the averages of the signal on 19 in each of the overlapping time intervals. Next, electronics 20 sends a signal to turn source 4 on, thereby exciting TRD probe 14 again. In such an iterative fashion, electronics 20 adjusts the overlapping time intervals to minimize the difference signal and provides the temperature as a function of one of the parameters in the time intervals.

Figure 2:
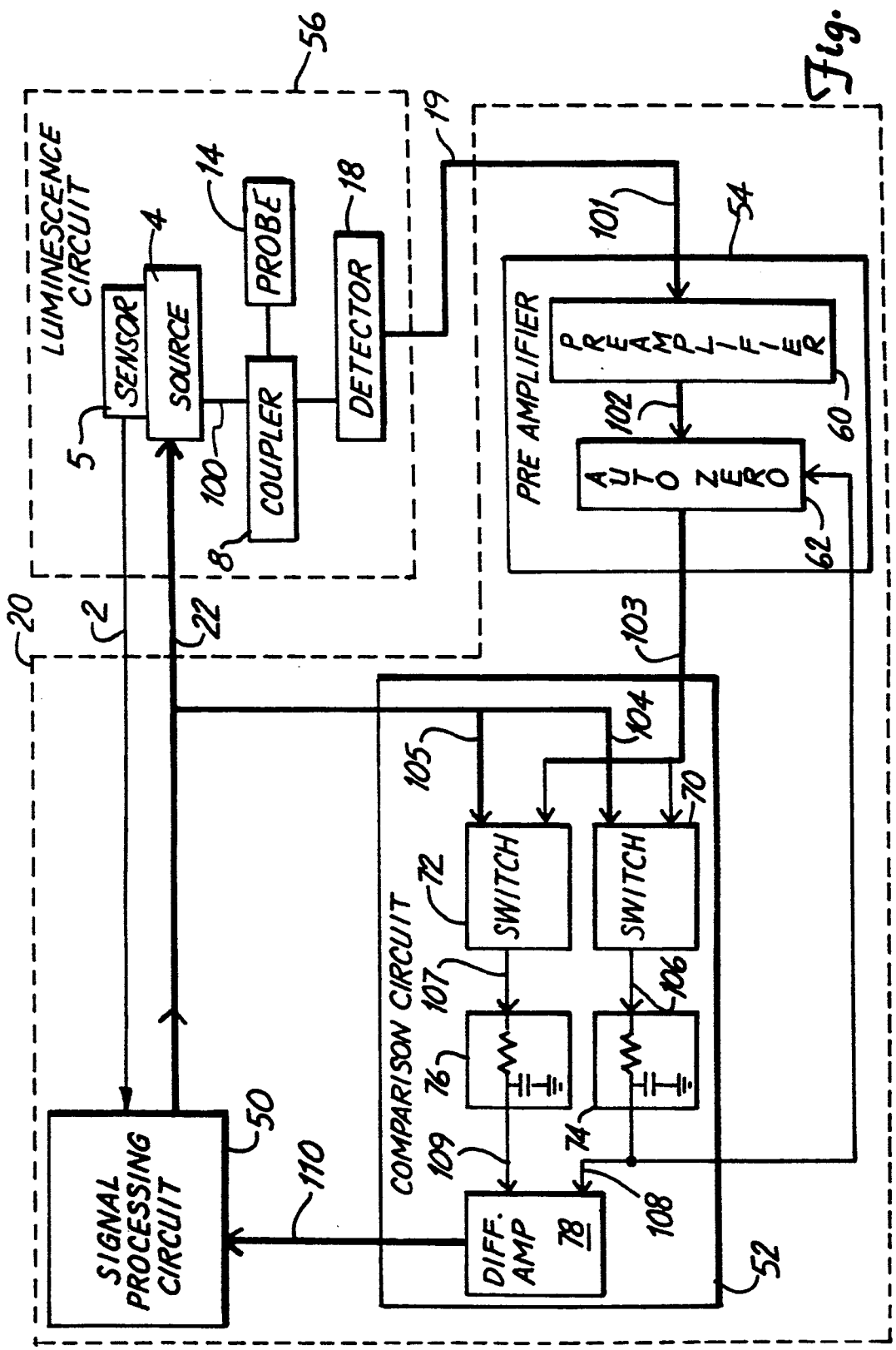
FIG. 2 is a block diagram of the signal processing electronics of FIG. 1.

In FIG. 2, the electronics of the TRD sensing application shown in FIG. 1 are detailed. Control circuit 20 include signal processing circuit 50, comparison circuit 52 and preamp circuit 54. A luminescent means 56 comprises source 4, temperature probe 14 and a detector 18. Cabling 22 connects control circuit 50 to source 4 and cabling 19 connects detector 18 to preamp circuit 54 within control circuit 20.

Figure 3:
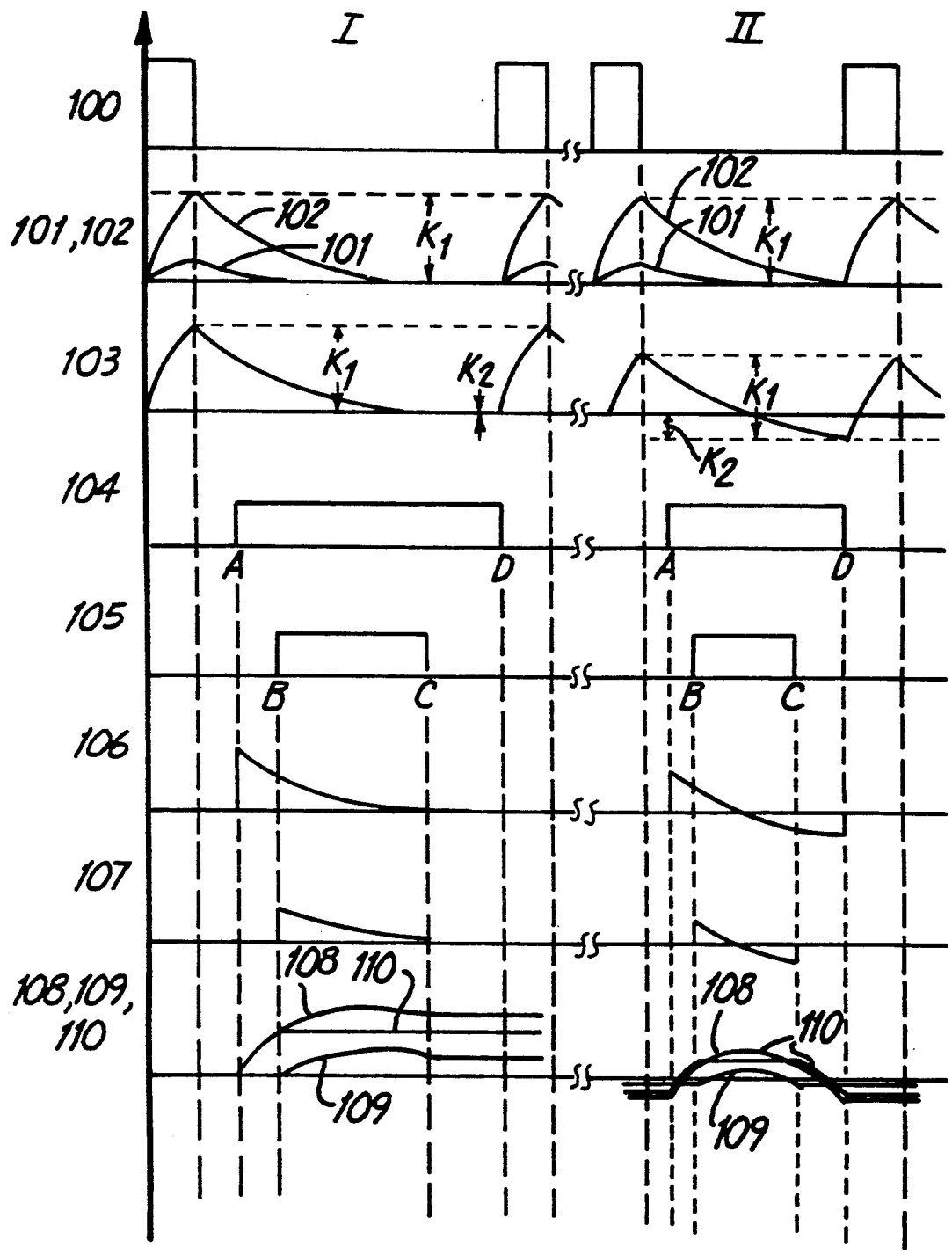
FIG. 3 is a representation of the signals in the electronics shown in FIG. 2.

FIG. 3 includes representations of signals as a function of time corresponding to signals labelled on FIG. 2. In FIG. 3, the section below label I shows signal response before steady state is reached and the section below label II shows steady state signal response. The vertical scale for signal 108,109 and 110 is expanded. In FIG. 2, source 4 light output, shown at 100, has variable pulse height, width and period and is described further below. Detector 18 output, shown at 101, is coupled to preamp circuit 54 over cable 19. Preamp circuit 54 comprises a preamp 60, which amplifies signal 101 with minimum distortion and noise to produce signal 102 having an amplitude $k_1$. An autozero circuit 62 substantially removes a DC component $k_2$ from input signal 102 to provide signal 103 for comparison circuit 52. Autozero means 62 comprises an integrating amplifier and summing amplifier which do not substantially distort the AC components of signal 102 as would other means for autozeroing such as a capacitor or a high pass filter.

Comparison circuit 52 receives two switch control signals, shown at 104,105, from signal processing circuit 50. Such signals control switching of signal 103 through switches 70,72 to produce signals 106,107. Signal 104 becomes active at A, controlling switch 70 to a low impedance state so that signal 103 is effectively connected to a low pass filter 74 through switch 70. Signal 104 becomes inactive at D, controlling switch 70 to a high impedance state so that signal 103 is effectively disconnected from filter 74. In like fashion, signal 103 is effectively connected to low pass filter 76 through switch 72 between the times B and C. Signals 104, 105 are overlapping signals since the active period for one of the signals is inclusive of the active period of the other one. The combination of switches 70,72 and control signals 104,105 effectively generate two samples of signal 103, one of which overlaps the other in time. Signal 106 is substantially the same as signal 103 between times A and D, and signal 107 is substantially the same as signal 103 between times B and C. Lowpass RC filters 74,76 filter signals 106,107 to produce filter signals 108, 109 respectively, which are coupled to a differential amplifier 78. Signal 108 is substantially expressed by:

$$\frac{\int_A^D (k_1 e^{-\frac{t}{\tau}} - k_2)dt}{D - A} \quad (2)$$

and signal 109 is expressed by:

$$\frac{\int_B^C (k_1 e^{-\frac{t}{\tau}} - k_2)dt}{C - B} \quad (3)$$

The signals 108, 109 are each representative of the average power of the luminescence during their respective sampled time period. Differential amplifier 78 output 110 is a slowly varying signal representative of the difference between signals 108, 109.

Signal 108 is fed back to autozero circuit 62, which dynamically adjusts $k_2$ and consequently the DC level of signal 103, and thereby signals 106,107,108,109, until the average value of signal 108 is minimized. This minimization of the average value of signal 108 prevents undesirable discharge or charge of the capacitor included in lowpass filter 74 when switch 70 is inactive. The discharging and charging action directly causes signals 108 and 109 to drift. In summary, signal 108 feedback into autozero circuit 62 minimizes drift in signals 108,109 by minimizing the discharging and charging of the capacitors in lowpass filters 74 and 76. Alternatively, signal 109 can be used in place of signal 108 as feedback to autozero circuit 62. If filters 74 and 76 did not allow charging or discharging of capacitors during their inactive periods then autozero means 62 may be eliminated.

Sampling of signal 103 occurs when source light output 100 is inactive. Such a sampling arrangement is preferable because no stringent requirements are placed on the optical system to differentiate between excitation and luminescence radiation.

Signal processing circuit 50 operation is based on values of A,B,C,D which satisfy Equation (4). Signal processing circuit 50 changes the sampling duration of the overlapping signals 104,105 until difference signal 110 is substantially zero:

$$\frac{1}{(D-A)} \int_A^D (k_1 e^{-\frac{t}{\tau}} - k_2)dt = \quad (4)$$

$$\frac{1}{(C-B)} \int_B^C (k_1 e^{-\frac{t}{\tau}} - k_2)dt$$

Equation (4) may be integrated and simplified to yield:

$$\frac{1}{D-A} \tau(e^{-\frac{A}{\tau}} - e^{-\frac{D}{\tau}}) = \frac{1}{C-B} \tau(e^{-\frac{B}{\tau}} - e^{-\frac{C}{\tau}}) \quad (5)$$

Note that Equation (5) is not affected by the value of substantially constant terms $k_1$ and $k_2$. The times A, B and C can be generally expressed by Equations (6–8).

$$A = \eta D \quad (6)$$

$$B = A + \alpha(D - A) \quad (7)$$

$$C = A + \beta(D - A) \quad (8)$$

Setting $\eta = 0$ simplifies Equations (5–8) and substitution of simplified Equations (6–8) back into Equation (5) and rearranging terms yields:

$$e^{-\alpha(\frac{D}{\tau})} - e^{-\beta(\frac{D}{\tau})} = (\beta - \alpha)(1 - e^{-\frac{D}{\tau}}) \quad (9)$$

Practical solutions to Equation (9) are dependent on noise levels and a tradeoff between the temperature probe response time and the needed accuracy, but are found generally where $$\alpha + \beta < 1 \quad (10)$$

and $$\beta \approx 1 - 2\alpha \quad (11)$$

After $\alpha$, $\beta$ and $\eta$ are selected, Equations (4),(5) and (9) are solved for D.

Figure 4:
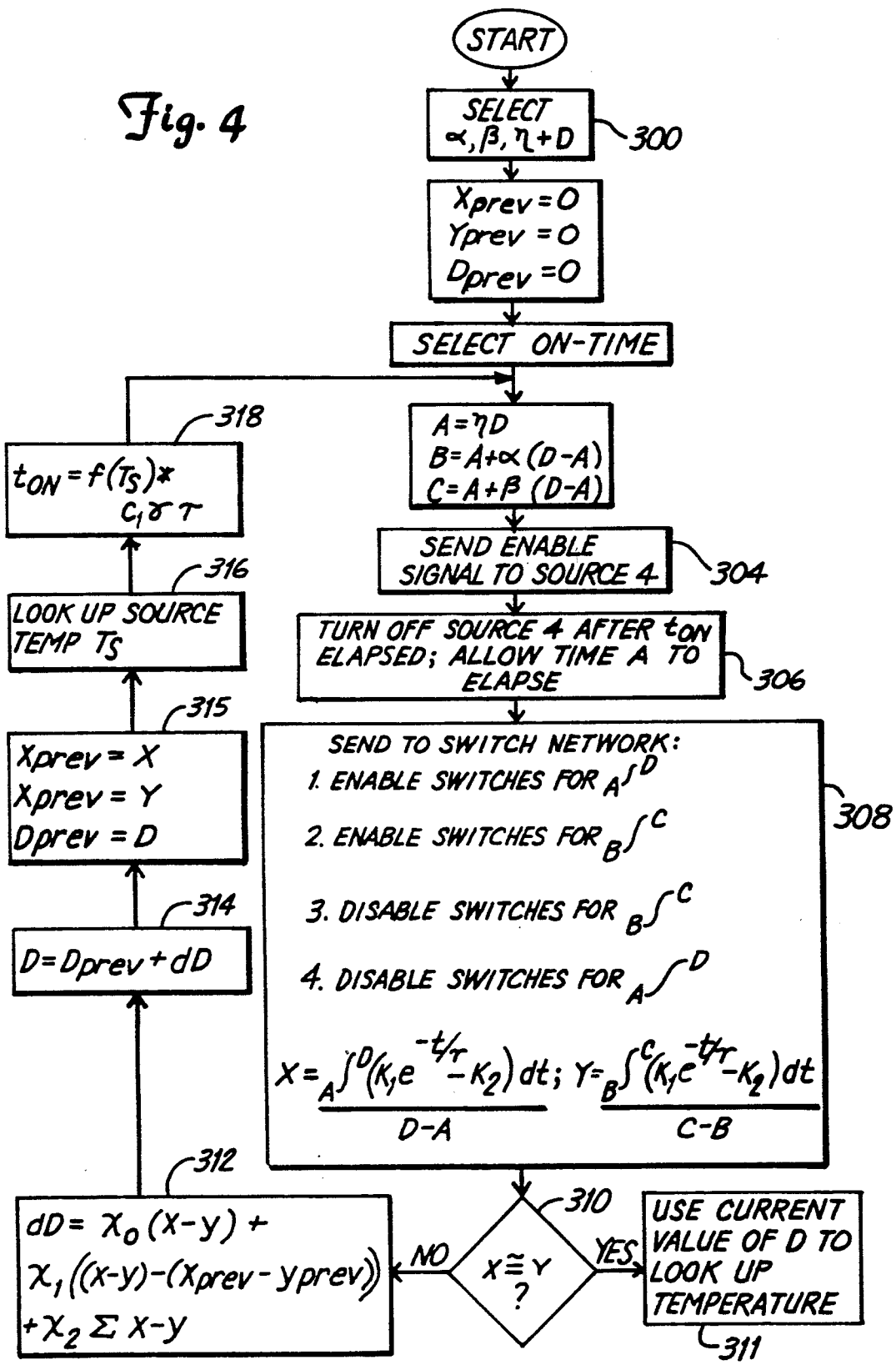
FIG. 4 is a flow chart showing operation of control circuit 50 in FIG. 2.

In FIG. 4, signal processing circuit 50 operation, preferably implemented in analog electronics, is flow charted. A microprocessor can also be used. At 300, fixed ratios $\alpha$, $\beta$ and $\eta$ are selected. The ratios are held constant and are initialized at power-up of the temperature sensing system. Initial values of variables D and $t_{ON}$ are selected. A pulse signal is sent to source 4 to initiate the excitation radiation, shown at 304. After time $t_{ON}$ has elapsed, a signal is sent to turn off source 4, shown at 306. After time A has elapsed, enable and disable signals are sent to switches 70,72, shown at 308. Signals 108,109 are produced as a result of block 308. An incremental change dD in D is calculated as a function of signals 108,109, shown at 312 and given by:

$$dD = \chi_0(x-y) + \chi_1[(x-y) - (x_{prev} - y_{prev})] + \chi_2 \Sigma(x-y) \quad (12)$$

where the quantity (x−y) is proportional to the difference between the average luminescent signal in the overlapping sampling intervals, the constants $\chi_0$, $\chi_1$ and $\chi_2$ are empirically determined and $x_{prev}$ and $y_{prev}$ are the value of x and y resulting from a previous source 4 pulse. A new value for D is assigned at 314. New values of variables $x_{prev}$, $y_{prev}$ and $D_{prev}$ are assigned at 315.

Source 4 temperature $T_s$ is measured at 316 using sensing means 5, which is thermally coupled to source 4 and connected to signal processing circuit 50 via cabling 2. The on-time of source 4 is stored in variable $t_{ON}$, which is generated as a function of the source temperature $T_s$, shown at 318 and given by:

$$t_{ON} = C_1 Df(T_s) \quad (13)$$

where $C_1$ is an empirically determined constant, D is defined above, $T_s$ is the temperature of source 4 and $f(T_s)$ is typically a first order linear function of $T_s$ such as $$C_2 T_s + C_3 \quad (14)$$

where $C_2$ and $C_3$ are constants selected to compensate for lower efficiency of source 4 at elevated source temperatures. The newly generated $t_{ON}$ is used by signal processing circuit 50 the next time the source enable signal is issued. Additionally, signal processing circuit 50 may also adjust the intensity of source 4 to compensate for temperature dependent changes in efficiency of source 4. When x is substantially equal to y at 310, D relates to temperature via a look-up table at 311.

Figure 5:
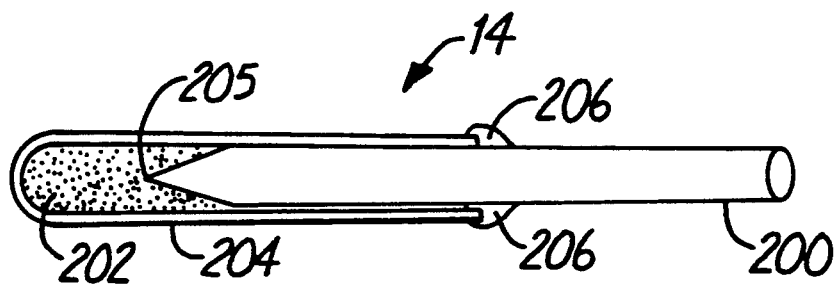
FIG. 5 is a cross sectional drawing of TRD probe 14.

In FIG. 5, TRD temperature probe 14 has a fiber optic cable 200 abutted to a quantity of luminescent powder 202 packed into the end of a fused silica tube 204. A glass bond 206,206 preferably of low temperature sealing glass, bonds silica tube 204 to optical fiber 200. There is no binder holding the powder particles in the tube end; powder 202 is firmly sandwiched between the end of tube 204 and the tapered end 205 of fiber 200. In other words, the spaces between the particles can be a vacuum or can be filled with a gas. Silica tube is a preferred material since it is readily available in sizes compatible with optical fibers, is easily fused to the optical fiber and has an expansion coefficient closely matched to that of the fiber so that the powder remains firmly packed over a wide temperature range. However, the temperature range can dictate that other types of tube material be used. Bond 206,206 is preferably made of glass because its expansion coefficient is close to that of silica tube 204. Additionally, silica tube 204 and fiber 200 are self aligning for ease of assembly, since fiber 200 diameter is slightly smaller than silica tube 204 diameter. Fiber 200 conducts light to powder 202, which emits decaying radiation at a characteristic wavelength upon termination of excitation wavelength, where the decaying radiation is substantially exponential and the time constant thereof is thermally responsive.

The luminescent material is in a powdered form which exhibits increased absorption characteristics over the characteristics of a solid. Increased effective absorption reduces the amount of luminescent material needed in each probe, thereby minimizing the sensor element mass and enhancing the thermal response characteristics of the probe. The powder randomly scatters the excitation and the luminescence, enhancing interchangeability in manufacture. A powder made of particles having diameters less than two-third fiber 200 diameter maximizes the measured luminescent signal levels. The diameter of fiber 200 is the light-carrying portion of the fiber and is exclusive of the buffer and cladding on the fiber.

Powder 202 is made of one or a combination of the following chromium doped materials: chromium doped gadolinium scandium gallium garnet (Cr:GSGG), chromium doped gadolinium gallium garnet (Cr:GGG) and chromium doped beryl (emerald). Emerald is also known as $Cr:Be_3Al_2(SiO_3)_6$. These materials have thermally responsive exponential decay constants within the temperature range of interest and high temperature quenching limits as shown below. The response is a typical number measured at room temperature and will change considerably over temperature.

| | | |
|---|---|---|
| Cr:GSGG | −0.27 μs/°C. | ~300° C. |
| Cr:GGG | −0.32 μs/°C. | ~400° C. |
| Emerald | −0.10 μs/°C. | ~500° C. |

Such materials are excited by radiation substantially between 660-690 nm, which is produced by commercially available solid-state light sources. These solid state light sources are more compact and have higher output power than do shorter wavelength sources. These chromium doped materials have a high quantum efficiency relative to other TRD related luminescent materials, so that the ratio of energy in luminescent radiation to the energy in the excitation radiation is higher than other similar materials. The emission spectrum of these materials is approximately between 700-900 nm, corresponding to the peak responsivity of the silicon photodiode detector. Lastly, these materials are stable at high temperatures.

Such chromium doped materials also exhibit quantum efficiency substantially independent of temperature. Quantum efficiency is the percentage of electrons which cause a photon to be emitted when they relax from an excited energy state to their ground energy state. A quantum efficiency of 100% indicates that any electron relaxation between an excited state and the electron's ground state will emit a photon. A temperature dependent quantum efficiency occurs when the excited electron is thermally coupled to at least one additional excited energy state, but from which a nonradiative path to the ground state exists. An increase in temperature yields a stronger coupling to this nonradiative state, causing fewer emitted photons and thus a decrease in the quantum efficiency of such material. Consequently, an increase in temperature causes the quantum efficiency of such a material to decrease.

Vanadium doped crystalline halides are alternatively used as particles in powder 202. Two such vanadium based crystalline halides are $V_2^{30}:KMgF_3$ and $V_2^+$: NaCl, which are excited by near infrared radiation, 770-780 nm. Such near infrared excitation has a significant advantage, since well-developed and highly reliable LED sources are available in this range which have even higher radiant output than the 660-690 nm sources.

Fiber 200 has a tapered end 205 embedded in luminescent powder 202. The taper effectively increases the numerical aperture of the fiber to increase the angle of acceptance over that of a perpendicularly cleaved fiber. The angle of acceptance defines a volume of powder which receives the excitation radiation. Powdered chromium and vanadium based luminescent materials are highly effective absorbers so that the volume of excited powder remains relatively close to the tapered probe tip. Because of the increased acceptance angle and the excited powder volume remaining close to the probe tip, the amount of luminescence coupled back into fiber 200 also increases, thereby increasing luminescent signal level over that of a perpendicularly cleaved fiber. A threefold increase in luminescent signal level has been measured when the diameter of bulk fiber 200 is 200 μm and the tip is tapered. The angle of the taper is typically about 12°. In general, the light-carrying core of the end of fiber 200 should have a smaller diameter than that of the light-carrying core of the bulk of fiber 200.

In practice, the taper of the tip is formed by locally heating a section of glass fiber while pulling on each end until the fiber separates in two sections. The angle of taper depends on the time elapsed during the pulling and the amount of heat applied to the fiber. In some cases, the pulling process results in a tapered fiber that is tilted such that the tip of the taper is not concentric to the fiber center. The end of the taper is typically rounded when viewed microscopically. Chemical etching may also be used to form the tapered tip, and is sometimes used where a fine degree of control over the taper is required.

Figure 5A:
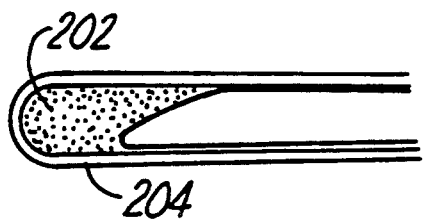
FIGS. 5A, 5B and 5C are cross sectional drawings of a TRD probe having various fiber tips.
Figure 5B:
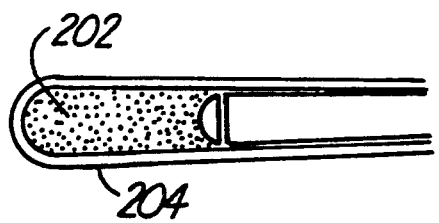
Figure 5C:
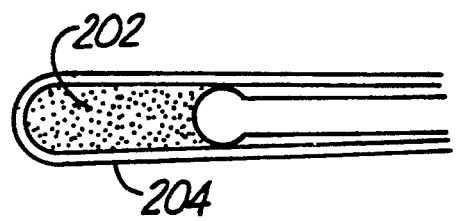

There are various ways to increase the numerical aperture of fiber 200. A tilted tapered fiber with rounded end is shown in FIG. 5A. Alternatively, the fiber end is cleaved and a separate lens is coupled to the fiber, as shown in FIG. 5B. In another embodiment, an integral bead or a ball lens is formed on the end of fiber 200, as shown in FIG. 5C.

FIG. 6 shows an alternate temperature probe 300 having blackbody temperature means and TRD luminescent means. An high temperature optical fiber 302 is attached to a TRD crystal 306 by a clear glass bond 308. In high temperature sensing applications, glass bond 308 may be omitted in order to avoid thermal stress. TRD crystal 306 is coated with a thin layer 310 of inert material such as a metal, effectively creating a blackbody radiator. The material should be at least one penetration depth thick, and preferably thicker. The blackbody radiation of the inert material intensifies as does the thickness, since a thicker material promotes absorption. A blackbody radiator has spectral emission characteristics varying as a function of temperature according to the StefanBoltzmann Law.

TRD luminescence has a practical high temperature limit, while blackbody emissions at low temperatures suffer from low signal levels. Consequently, a probe based on both TRD and blackbody temperature sensing senses a wider range of temperatures than either of the two sensing methods without sacrificing sensitivity. The TRD luminescence mechanism is limited at higher temperatures by quenching, where higher temperatures modify electron energy states such that energy emitted from electron relaxation is no longer in the form of photons. Low temperature limit of miniature fiber blackbody radiation depends on various factors such as fiber size, system losses, the detector and fiber used, but is practically limited at about 500° C.

Surface finish for crystal 306 affects the amount of luminescence which exits the crystal into the fiber, altering luminescent signal levels and slightly changing decay times from one crystal to another, thereby affecting interchangeability. Sandblasting, or other means of uniformly roughening the surface reduces differences between the signal level from crystals. Alternatively, a coating of glass or similar material having an index of refraction lower than that of the sample allows luminescence to exit the crystal more efficiently, thereby improving signal level while simultaneously improving interchangeability.

Radiation trapping, where part of the luminescence signal is reflected back into the crystal, is responsible for the interchangeability discussed above. It is generally undesirable since it increases variations in luminescent signal level and measured decay times between various crystals. Radiation trapping becomes significant when the absorption length of the emitted light is substantially the same as or less than the path length of the light within the crystal. A polished surface finish reflects more luminescence back into the crystal than does an abraded surface. Depending on the spectral absorption and emission characteristics of the luminescence, the trapped radiation has a finite probability of being absorbed and re-emitted by the luminescent material. The absorption and re-emission is the process responsible for changing the time rate of decay of the light captured by the fiber.

Electronics for the combination blackbody/TRD sensor include TRD electronics as in FIG. 2 coupled to blackbody emission sensing electronics, which sense the total amplitude of broadband light radiated from the blackbody, or employ a wavelength ratioing technique.

In FIG. 7, a system 400 of three LED sources 401,402,404 are coupled to a fiber optics highway 406 and fiber optics highway segments 406a,406b. Sources 401,402,404 have differing distinctive spectral characteristics centered around $\lambda_1$, $\lambda_2$ and $\lambda_3$. Three port wavelength division couplers 408,410,412 have distinctive spectral characteristics as shown at 414,416,418, respectively in FIGS. 7A, 7B and 7C. In sketches 414,416,418, the dashed line represents the coupler characteristics between the leftmost coupler port connected to the data highway and the port connected to the probe for each of the couplers 408,410,412, respectively. The unbroken line in such sketches represents the coupler Characteristics between the rightmost port and the leftmost port for each of couplers 408,410,412 respectively. Coupler 408 diverts a narrow band of frequencies centered around $\lambda_1$ from the highway to probe 420, but substantially transmits those wavelengths centered around $\lambda_2$ and $\lambda_3$ across the highway, see 414. In like fashion, coupler 410 exclusively diverts those wavelengths centered around $\lambda_2$, see 416, and coupler 412 exclusively diverts those wavelengths centered around $\lambda_3$, see 418.

TRD probes 420,422,424 include luminescent material in powdered form and are connected to couplers 408,410,412 respectively by optical fibers 426,428,430. The luminescent material in probes 420,422,424, which can alternately take a crystal form, a powder embedded in a binder, or a powder not imbedded in a binder, is excited by radiation including those wavelengths $\lambda_1$, $\lambda_2$ and $\lambda_3$. The luminescent material emits luminescence centered about $\lambda_4$, shown at 432,434,436 Couplers 408,410,412 divert wavelengths centered around $\lambda_4$.

For example, coupler 408 receives excitation centered about $\lambda_1$ from source 401 over highway 406 and substantially diverts it to probe 420 over fiber 426. The radiation from source 401 does not substantially pass to probes 422,424 since coupler 408 does not pass radiation centered around $\lambda_1$ to highway 406a. Luminescence from probe 420, centered about $\lambda_4$, is slightly attenuated by coupler 408 but is passed to electronics 403 over highway 406. Electronics 403 provide an output representative of the thermally responsive time constant $\tau$ and are of the form discussed above in FIG. 2. In similar fashion, source 402 sends excitation centered about $\lambda_2$ over highway 406 to coupler 408, which substantially passes such excitation between the coupler's leftmost port and the rightmost port. Such excitation reaches coupler 410 over 406a diverts the wavelengths centered about $\lambda_2$ to the coupler's bottom port, over the fiber 428 to probe 422. Such excitation is substantially blocked from reaching probes 420, 424 because couplers 408,412 do not divert wavelengths centered about $\lambda_2$ and coupler 410 effectively diverts such wavelengths toward probe 422. Luminescence from probe 422, centered about $\lambda_4$ is slightly attenuated by the return path to electronics 403 through coupler 410, highway segment 406a, coupler 408 and highway 406. The number of couplers is practically limited by the luminescent signal strength after passing through the couplers, which must be on the order of a few nanowatts in order for electronics 403 to distinguish signal from noise. Luminescence from probe 424 is excited by excitation from source 404 and passes through couplers 412,410,408 on the path to electronics 403 in a similar fashion.

In this embodiment, couplers 408,410,412 are three-port wavelength division couplers. Alternatively, a single triple port wavelength division coupler can be used in place of couplers 408,410,412.

The order of the source excitation outputs is arbitrary, as is the length of the on-time. However, the pulses must be sufficiently long to excite luminescence and the time between the pulses must be sufficiently long for the resultant luminescence to reach the electronics. Other modifications, such as the number of probes, may be made to the multiplexed system, but several requirements must be met. One light source is required for each probe which is multiplexed. No two light sources emit the same wavelength, but all the wavelengths are within the band of wavelengths which excite the luminescent material in each of the probes.

What is claimed is:

1. A TRD optical temperature sensor comprising an elongate optical fiber having a luminescent material at one end so as to optically communicate therewith, the luminescent material providing luminescent optical emissions having a thermally responsive time-rate-of-decay, the luminescent material comprising a vanadium-doped halide.

2. A TRD optical temperature sensor according to claim 1 wherein the luminescent material is $V_2^+:KM_xF_3$ or $V_2^+:NaCl$.

3. A TRD optical temperature sensor according to claim wherein the luminescent material is a vanadium-doped halide which is excitable to luminesce by radiation in the range of 770 to 780 nm.

* * * * *